United States Patent
McGovern et al.

(10) Patent No.: US 7,063,459 B2
(45) Date of Patent: Jun. 20, 2006

(54) DENTAL X-RAY PACKETS HAVING NON-LEAD RADIATION SHIELDING

(75) Inventors: Michael R. McGovern, Rochester, NY (US); David J. Steklenski, Rochester, NY (US); Andrew W. Cappella, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/975,648

(22) Filed: Oct. 28, 2004

(65) Prior Publication Data

US 2006/0098788 A1   May 11, 2006

(51) Int. Cl.
*A61B 6/14* (2006.01)
(52) U.S. Cl. ....................... 378/169; 378/168
(58) Field of Classification Search ............... 378/168, 378/169, 182, 184, 185, 186
See application file for complete search history.

(56) References Cited

U.S. PATENT DOCUMENTS

| | | | |
|---|---|---|---|
| 4,670,658 A | | 6/1987 | Meyers |
| 4,909,389 A | * | 3/1990 | Plessers et al. ............. 206/451 |
| 4,911,871 A | * | 3/1990 | Liese, Jr. .................... 264/102 |
| 4,912,740 A | | 3/1990 | Liese, Jr. |
| 4,922,511 A | | 5/1990 | Gay |
| 5,077,779 A | | 12/1991 | Steinhausen, Jr. |
| 5,550,383 A | * | 8/1996 | Haskell .................... 250/519.1 |
| 5,887,213 A | * | 3/1999 | Welp .......................... 396/594 |
| 6,042,267 A | | 3/2000 | Muraki et al. |
| 6,153,666 A | * | 11/2000 | Lagace ....................... 523/136 |
| 6,309,101 B1 | | 10/2001 | Bacchetta et al. |
| 6,315,444 B1 | | 11/2001 | Koren |
| 6,459,091 B1 | | 10/2002 | DeMeo et al. |
| 6,474,864 B1 | | 11/2002 | Resch et al. |
| 6,505,965 B1 | | 1/2003 | McGovern |
| 6,579,007 B1 | | 6/2003 | Bacchetta et al. |
| 2002/0071934 A1 | * | 6/2002 | Marutsuka ................. 428/131 |
| 2002/0076640 A1 | * | 6/2002 | Zegel et al. ................ 430/139 |

OTHER PUBLICATIONS

U.S. Appl. No. 10/734,861, filed Dec. 12, 2003, Inventor McGovern et al., Eastman Kodak Company.
Hatela Dental X-Ray Film & "Daylight" Processing System, Processing Pages, Hanshin Technical Laboratory, LTD.

* cited by examiner

*Primary Examiner*—Edward J. Glick
*Assistant Examiner*—Mona Sanei
(74) *Attorney, Agent, or Firm*—Susan L. Parulski; Nelson Adrian Blish

(57) ABSTRACT

An intraoral x-ray film packet having non-lead radiation shielding for shielding scattered radiation. The packet includes a film chip and a radiation shielding member. The film chip has two sides and the radiation shielding element is disposed on one side of the film chip to provide radiation shielding when the film packet is exposed to radiation. The radiation shielding element is made of a material including a thermoplastic and a non-lead metal powder and/or non-lead metal compound. In one configuration, the film chip and the radiation shielding element are disposed within a light-tight envelope. In another configuration, the radiation shielding element is one side of the envelope, wherein the envelope has two opposing sides, and the chip is disposed within the envelope.

10 Claims, 3 Drawing Sheets

DENTAL X-RAY PACKETS HAVING NON-LEAD RADIATION SHIELDING

FIELD OF THE INVENTION

The present invention relates generally to x-ray film packets, and in particular, to intraoral radiographic x-ray film packets which do not employ lead for scattered radiation shielding.

BACKGROUND OF THE INVENTION

Intraoral radiographic x-ray film packets, also generally referred to as intraoral radiographic film packets or dental x-ray packets have been employed in dental offices to capture x-rays of a patient's teeth and gums. Such dental x-ray packets are disclosed in U.S. Pat. No. 6,309,101 (Bacchetta), U.S. Pat. No. 6,474,864 (Resch), U.S. Pat. No. 6,505,965 (McGovern), U.S. Pat. No. 6,579,007 (Bacchetta), U.S. Pat. No. 5,077,779 (Steinhausen), U.S. Pat. No. 4,922,511 (Gay), U.S. Pat. No. 4,912,740 (Liese, Jr.), all commonly assigned and incorporated herein by reference.

It is known in the art that heavy metals provide a shielding effect against various forms of radiation. Their effectiveness is associated with the size of their atomic nucleus or as is commonly referred in the art, their absorption cross-section. An effective heavy metal used to provide the shielding function in current medical and dental radiography is lead (atomic number 82). Lead has several advantages. The ease, with which it is formed, combined with its high density and relatively low cost make it a prime material to use in x-ray applications. Lead also provides high quality radiographic images by minimizing the image effects of backscattered radiation.

Yet, since certain heavy metals, like lead, are difficult to handle in certain applications and there is a perception that these heavy metals pose environmental issues, there exists an opportunity to not use lead for dental and medical radiographic applications. This opportunity exists even for applications wherein there is no patient contact with the lead, such as dental x-ray packets. Accordingly, there exists a need for a dental x-ray packet that does not employ lead for radiation shielding.

U.S. Pat. No. 6,459,091 (DeMeo) relates to a radiation protective garment having barium sulfate coated fibers. U.S. Pat. No. 4,670,658 (Meyers) is directed to a flexible sheet coated with barium sulfate that is used to shield or protect medical personnel during procedures where radiation backscatter can be a problem. While such systems may have achieved certain degrees of success in their particular applications, such materials are not suitable for shielding radiation in a dental x-ray packet because the required thickness to provide equivalent absorption would make the dental packet exceed ANSI standards and too rigid.

U.S. Pat. No. 6,042,267 (Muraki) discloses an intraoral x-ray image pickup apparatus which uses copper tungsten as an x-ray shielding member which is not suitable for the present application because of the necessary thickness to realize the same x-ray shielding effect as that of the lead member.

U.S. Ser. No. 10/734,861 titled INTRAORAL RADIOGRAPHIC DENTAL X-RAY PACKETS HAVING NON-LEAD RADIATION SHIELDING by McGovern et al, filed on Dec. 12, 2003, commonly assigned and incorporated herein by reference, is directed to a dental x-ray film packet which does not employ lead for radiation shielding.

The company Hanshin Technical Laboratory, Ltd. of Japan advertises a "Dental X-ray film and Daylight" processing system product which employs an "Instant Film" such as the DIF size 2 (30×40 mm), the DQD monobath solution for rapid development of the "Instant Film" in conjunction with a "Pusher" fixed volume injector with a nozzle that attaches to the top of the "DQD" bottle. Hanshin claims that diagnosis can be done in 30 seconds or more when using this system. As best understood by Applicant through Applicant's experimentation, Hanshin's dental packet has an outer envelope including a first layer which is a non-black colored layer comprising polyvinyl chloride (PVC) and a second layer which is a black PVC layer containing lead oxide in an amount intended to provide radiation shielding of a film chip. The layer containing the lead oxide is an inside layer, that is, the lead oxide containing layer does not come into direct contact with a patient.

The present invention is directed to a dental x-ray packet which does not employ lead for radiation shielding, and such radiation shielding material is sufficiently malleable/formable so as to be incorporated into a dental x-ray packet, yet provide for comfortable operation when used by a patient, and still minimize the image effects of backscattered radiation.

SUMMARY OF THE INVENTION

An object of the present invention is to provide a dental x-ray packet that does not employ lead for radiation shielding.

Another object of the present invention is to provide such a dental x-ray packet that provides comfortable operation when used by a patient.

A further object of the present invention is to provide such a dental x-ray packet that provides high quality radiographic images.

Yet another object of the present invention is to provide such a dental x-ray packet that employs a material that is not perceived to have environmental issues.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a dental x-ray packet having non-lead radiation shielding. The packet includes a film chip and a radiation shielding member. The film chip has two sides and the radiation shielding element is disposed on one side of the film chip to provide radiation shielding when the film packet is exposed to radiation. The radiation shielding element is made of a material including a thermoplastic and a non-lead metal powder and/or non-lead metal compound. In one configuration, the film chip and the radiation shielding element are disposed within a light-tight envelope. In another configuration, the radiation shielding element is one side of the envelope, wherein the envelope has two opposing sides, and the chip is disposed within the envelope.

According to another aspect of the present invention, there is provided a container for an intraoral x-ray film packet having an film chip disposed within an outer envelope. The container includes two sheets forming an opening into which the x-ray film packet is inserted. One of the sheets is comprised of a material including a thermoplastic and a non-lead metal powder and/or non-lead metal compound sufficient for radiation shielding of the film chip.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
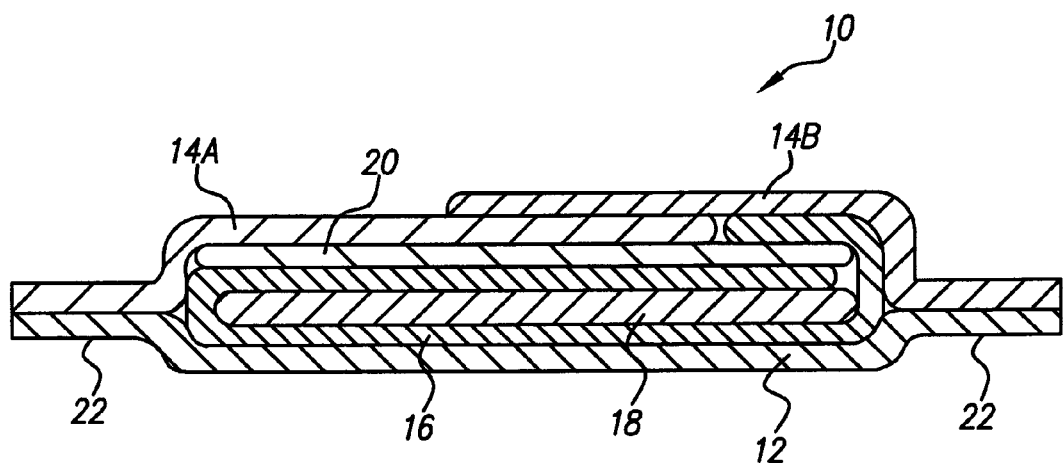
FIG. 1 shows a diagrammatic cross-sectional view of a dental film packet in accordance with a first embodiment of the present invention.

The following is a detailed description of the preferred embodiments of the invention, reference being made to the drawings in which the same reference numerals identify the same elements of structure in each of the several figures.

Typically, lead foil (which is an alloy of lead with about 1.5% tin and about 2.5% antimony) is currently used in dental packets for scattered radiation shielding. That is, the lead foil is intended to shield the film (within the dental packet) from scattered radiation.

Generally, the present invention relates to the use of a radiation shielding material comprised of a thermoplastic into which is compounded a non-lead metal powder and/or non-lead metal compound so as to shield the film of the dental packet from scattered radiation FIG. 1 shows a cross-section of a dental x-ray packet 10 in accordance with a first embodiment of the present invention. Dental x-ray packet 10 includes an outer envelope comprising two opposing sheets. In the particular embodiment shown in FIG. 1, the outer envelope comprises a first sheet 12 on one face of packet 10 and a pair of overlapping sheets 14A,14B on the opposite face thereof. Contained within sheets 12,14A,14B is a paper wrap element 16, a film chip 18, and a radiation-shielding element shown as radiation shielding member 20. Some packets comprise two or more film chips 18, rather than a single film chip, to provide a duplicate image for the patient (for example, for military use).

In the embodiment shown in FIG. 1, sheets 12,14A,14B project beyond dimensions of paper wrap element 16, film chip 18, and radiation shielding member 20 to yield a laminated perimetric edge 22. Laminated perimetric edge 22 allows for heat-sealing of sheets 12 and 14 to one another to yield a light tight perimeter to packet 10. A heat seal can be generated at the overlap of sheets 14 to provide an outer envelope that is substantially light tight.

Sheets 12,14A,14B can be comprised of a soft thermoplastic material such as, but not limited to, polyvinyl chloride (PVC) or ethylene vinyl acetate (E/VA) of a known vinylacetate comonomer content.

Radiation shielding member 20 is not comprised of lead. Rather the radiation shielding member 20 is comprised of a radiation shielding material, more particularly, a thermoplastic into which is compounded a non-lead metal powder and/or non-lead metal compound.

A variety of thermoplastics can be employed. Examples include but are not limited to, polyesters such as polyethylene terphthalate (PET) along with various PET like copolymers like PETG and PCTG, polyvinyl chloride, ethylenevinyl acetate, polyurethane, polyamdies, polycarbonates, polyethers, polystyrenes, ABS terpolymers, polymethylmethacrylate, styrene acrylonitrile copolymers, cyclic olefin coplymers, polyethylenes (such as LDPE, LLDPE and HDPE), polypropylenes (both homopolymers and copolymers), polysulfones, polyetherether ketones, and polyimides.

In a preferred embodiment, the thermoplastic material is a polyvinyl chloride (PVC), and more particularly, a plasticized polyvinyl chloride (pPVC).

Examples of suitable non-lead metal powders include, but are not limited to: tin, tungsten, zinc, iron, magnesium, titanium, bismuth, copper, aluminum and silver.

The non-lead metal powder is preferably tin (atomic symbol Sn and atomic number 50) and is sufficient to absorb backscattered radiation in at oral x-ray energies from about 40 to 100 kVp, preferably 60 to about 80 kVp, where kVp stands for peak kilovoltage and represents the accelerating voltage of the x-ray generator and is a measure of the peak energy of the x-ray photon.

More particularly, radiation shielding member 20 is preferably comprised of at least 20 percent by weight of a non-lead metal powder, sufficient to provide suitable radiation shielding for dental applications.

Examples of suitable non-lead metal compounds include, but are not limited to: bromides, sulfides, oxides, chlorides, phosphates, phosphites, iodides and nitrides of each of the non-lead metal powders to form the non-lead metal compounds.

The non-lead metal compounds are preferably compounds of tin, and more particularly, tin oxide.

The radiation shielding material of radiation-shielding member 20 is comprised of at least 20 percent by weight of a non-lead metal compounds, sufficient to provide suitable radiation shielding for dental applications.

Compounding the thermoplastic with the non-lead metal powder and/or non-lead metal compound provides advantageous characteristics for the radiation shielding material of radiation shielding member 20. For example, the thermoplastic can be soft, flexible, and compliant. These features can provide comfortable use when the dental packet is placed in a patient's mouth.

Figure 2:
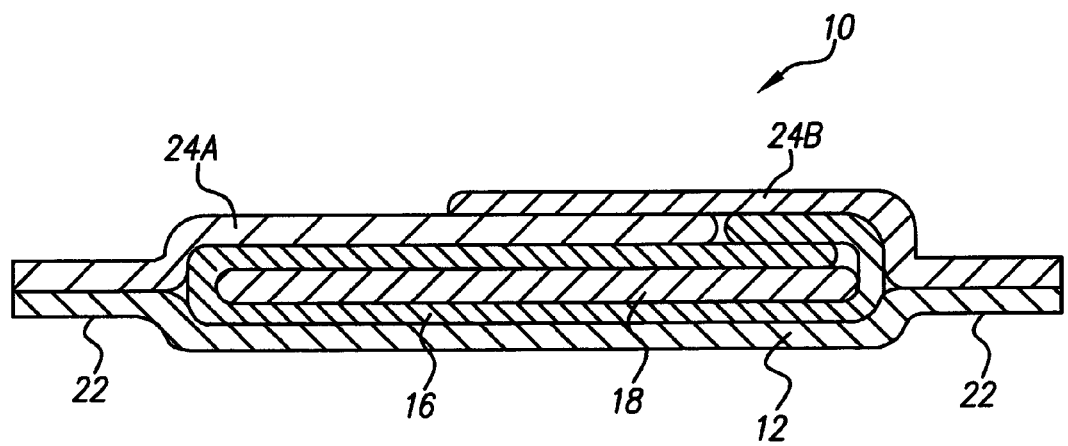
FIG. 2 shows a diagrammatic cross-sectional view of a dental film packet in accordance with a second embodiment of the present invention.

In a second embodiment, shown in FIG. 2, radiation shielding member 20 is not employed. Rather, the radiation shielding element is a portion of the envelope. That is, at least one of the sheets of the outer envelope of packet 10 includes the radiation shielding material discussed above with reference to member 20. For example, as shown in FIG. 2, packet 10 includes an outer envelope comprising first sheet 12 on one face of packet 10 and a pair of overlapping sheets 24A,24B on the opposite face thereof. Contained within sheets 12,24A, 24B is paper wrap element 16 and film chip 18.

Sheets 24A and 24B are comprised of the radiation shielding material described above with reference to radiation shielding member 20. As indicated above, an advantage of this material is that it can be soft, flexible, and compliant. As such, it can be employed to form the outer envelope of packet 10. Thus, an advantage of this second embodiment is the elimination of radiation shielding member 20.

Sheets 24A,24B can be a single layer or multilayer construction that provide various configuration for distribution of the non-lead metal powder and/or non-lead metal compound to provide the radiation shielding for the non-tube or back side of the dental packet. Layers in the multiplayer construction might include, but are not limited to, a moisture barrier layer, light shielding layer, and a decorative covering.

Figure 3:
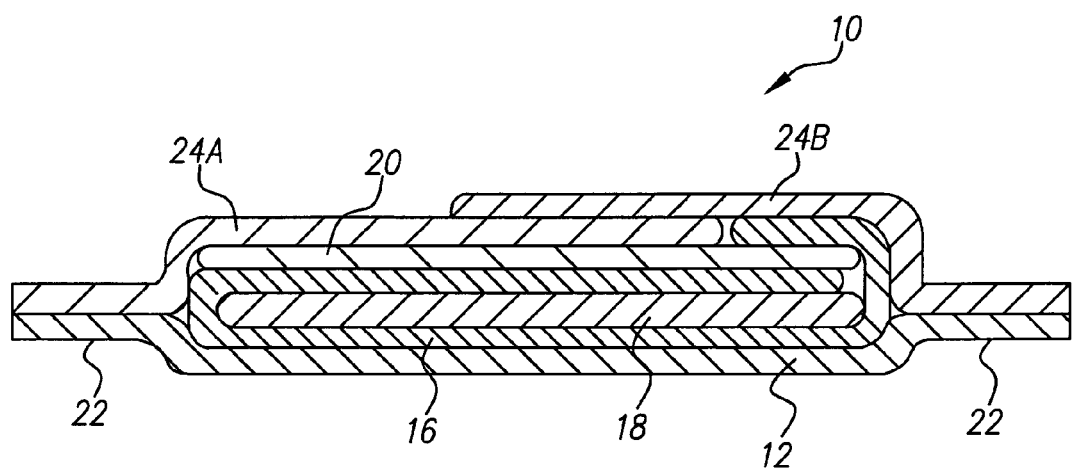
FIG. 3 shows a diagrammatic cross-sectional view of a dental film packet in accordance with a third embodiment of the present invention.

In a third embodiment, shown in FIG. 3, radiation shielding member 20 is employed in addition to sheets 24A,24B. That is, both radiation shielding member 20 and overlapping sheets 24A,24B comprise the radiation shielding material. This embodiment may be preferred when high doses of x-ray radiation are being considered.

In another arrangement, radiation shielding member 20 is a foil thermoplastic laminate. That is, a single or multi-layered laminate comprising a single layer or plurality of layers of a thermoplastic film bonded to a single layer or plurality of layers of thin metal foils or depositions that would provide sufficient radiation shielding of the film chip.

Examples of suitable thermoplastic films include, but are not limited to, polyesters such as polyethylene terphthalate (PET) along with various PET-like copolymers such as PETG and PCTG, polyvinyl chloride, ethylene vinyl acetate, polyurethane, polyamides, polycarbonates, polyethers, polystyrenes, ABS terpolymers, polymethylemethacrylates, styrene acrylonitrile copolymers, cyclic olefin copolymers, polyethylene's (such as LDPE, LLDPE and HDPE), polypropylenes (both homopolymers and copolymers), polysulfones, polyether ether ketones, and polyimides.

The single or multi-layered thin foils or depositions of suitable non-lead metal powders can include aluminum, magnesium, titanium, iron, copper, zinc, silver, tin, and tungsten.

The single or multi-layered thin foils or depositions of suitable non-lead metal compounds can include bromides, sulfides, oxides, chlorides, phosphates, phosphites, iodides, and nitrides.

Thin metal foil to thermoplastic film laminates can be produced by means of several known manufacturing methods. Examples include thermal techniques and several metal deposition methods such as vacuum metallizing or spray metal techniques. Numerous food-packaging applications where moisture ingress is of particular concern have employed these types of technologies. Suitable barrier properties are provided using plastic-metal foil laminates.

Several layer constructions can be used for the laminate, up to a practical limit for size, shape, weight and comfort level for the patient. One example employs a three-layer construction wherein a first layer is comprised of a thermoplastic film, a second layer is comprised of a metal foil produced from a non-lead metal powder and/or non-lead metal compound that provides the radiation shielding, and a third layer which is comprised of a thermoplastic film, wherein the second layer is disposed intermediate the first and third layers and provides radiation shielding.

In a basic embodiment, a two layer laminate construction would include a single ply of a thermoplastic film bonded to a single layer of a non-lead metal or non-lead metal compound in a foil design. This would become the radiation shielding member 20 in this arrangement.

In a further embodiment of the present invention, sheets 24A,24B can be a laminate, more particularly, a thermoplastic film laminated with a non-lead metal foil. In this embodiment, since the formed laminate is now the non-tube side or backside of the dental packet, the thermoplastic film (of the laminate) need only be polyvinyl chloride, polyvinyl acetate copolymer (of a known acetate co monomer content), polyamides and polyurethanes. The non-lead metal foil that is laminated to the thermoplastic film can be selected from the metals listed in Table 1. This non-lead metal foil can be the element in the laminate that provides the required level of radiation shielding. The required thickness of the non-lead metal foil will vary as a function of the particular metal selected as determined by the metals' absorption cross section. A typical non-lead metal film nominal thickness is approximately 0.0022 inches.

In still another arrangement, film packet 10 can be disposed within a protective covering. Such a protective covering might be desirable in infectious situations. After the x-ray was obtained, the protective covering can be removed to access the film packet for subsequent development so as to minimize any health risk to the dentist and/or health worker.

Figure 4:
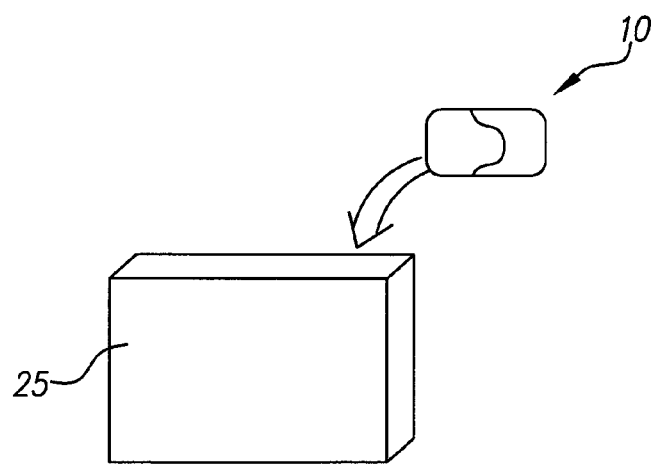
FIG. 4 shows an envelope for effecting radiation shielding of a dental film packet.

Referring now to FIG. 4, a sealed flexible container, packaging envelope, sack or pouch 25 comprised of a thermoplastic resin, such as polyethylene, can be used wherein one layer would provide radiation shielding protection as the backside or non-tube side of this external pouch that would contain dental packet 10. This layer would include a suitable level of a non-lead metal powder and/or non-lead metal compound produced by means of a compounding step in order to provide a sufficient level of radiation shielding protection. Another layer could be used, wherein this another layer does not contain any non-lead metal powder and/or non-lead metal compound in composition. In this arrangement, the flexible pouch could be a single or a multi-layer construction.

Once the dental packet has been properly oriented between the back-side and the front side of the thermoplastic flexible pouch, the pouch can be sealed on all four sides with an orientation notch. The notch can provide an easy opening feature on the pouch to facilitate opening the pouch to remove the now exposed dental packet. The one layer (i.e., backside, non-tube side) including the non-lead metal powder and/or non-lead metal compound could be readily identified by means of a distinct color and/or appropriate marking and identification as well as surface roughness difference between it and another layer that would not contain the non-lead metal powder and/or non-lead metal compound for radiation shielding.

In another arrangement for this external enclosure, dental packet 10 could be encased in pouch 25 wherein pouch 25 is a thermoplastic component that is thermoformed or injection molded.

Preferably, pouch 25 is disposable to minimize any health risk to the dentist and/or health worker. Pouch 25 can be made from several different types of thermoplastic resins. Examples include, but are not limited to, high density polyethylene, low density polyethylene, liner low density polyethylene as well as both homopolymer and copolymer polypropylenes. Such pouches can be produced by means of a molding (such as injection molding) or forming process. As fabricated surfaces of containers could vary as to surface roughness, identification markings, colors or other features, such features could facilitate the insertion of the dental packet prior to exposure as well as removal of the packet for development and subsequent examination by the health care worker.

The compounding of thermoplastic with non-lead metal powder and/or non-lead metal compound would preferably absorb at about the same amount of 60 kVp to about 80 kVp x-ray photons at a thickness of about 0.002 inches of lead.

Applicants have recognized advantages of using tin over other non-lead metals. For comparative purposes, Table 1 is provided to show the calculated thickness in inches of several common metallic foils which would be needed to absorb the same percentage of 60 and 80 kVp x-ray photons as absorbed by the currently used 0.002 inches of lead.

TABLE 1

| Metal | 80 kVp Equivalent thickness | 60 kVp Equivalent thickness |
| --- | --- | --- |
| Al | 0.1008 | 0.1520 |
| Mg | 0.1618 | 0.2549 |
| Ti | 0.0298 | 0.0328 |
| Fe | 0.0117 | 0.0120 |
| Cu | 0.0080 | 0.0080 |
| Zn | 0.0092 | 0.0091 |
| Ag | 0.0020 | 0.0019 |
| Sn | 0.0025 | 0.0024 |
| W | 0.0004 | 0.0016 |
| Pb | 0.0020 | 0.0020 |

Estimates of the level of metal powder and/or metal compound to obtain a desired level of radiation shielding (for example, the achieve the level of radiation shielding currently available in dental x-ray packets employing lead) can vary from one metal to another metal. Estimates range from about 15 percent to about 50 percent by weight of the metal, owing to thickness limitations the applications. For example, for a species known as gray tin, particle size in the range of from about 5 to 40 microns with at least 90.0% of a +200 mesh size per a screen analysis size have been found suitable.

Some common non-lead metal powders and/or metal compounds (for example, those based on aluminum, magnesium, copper, zinc, and iron), when compounded into the appropriate thermoplastic matrix, are unsuitable for Applicant's dental application because of thickness issues associated with the construction of the packet. That is, the thickness would be too great to be practical for use.

Applicants have recognized that metallic powdered tin and/or tin compounds can be purchased at a reasonable price, have a substantially equivalent absorption relationship with lead, and be amenable to use with existing manufacturing equipment. Accordingly, the dental packet based on powder tin and/or tin compound would have approximately the same or smaller thickness as existing packets based on the lead foil, would have similar flexibility, and would have the same ability to absorb backscattered radiation.

With regard to the first embodiment shown in FIG. 1, the radiation shielding member of the present invention has such a thickness that radiation shielding member 20 can be substituted for the lead foil currently used within dental x-ray packets, thereby allowing existing dental x-ray packets to be manufactured with the radiation shielding member 20 of the present invention. This allows use of the packet of the present invention with existing dental accessories.

Tin is silvery, malleable and is a soft metal that is readily available in powder form as well as powdered compounds. Tin is located in group IVB on the periodic table, and its atomic mass is 118.710. There are two oxidation states (4&2). Tin melts at about 232 degrees C. and boils at about 2270 degrees C. The density 7.31 grams/cc versus 11.35 grams/cc for lead. Tin has a crystalline structure. The crystal structure is tetragonal. The ordinary form of the metal is the beta form known as white tin.

Powdered tin metal and/or tin oxide provides an absorption cross section similar to that of lead at diagnostic x-ray energies, with similar manufacturing processes, but is viewed as having fewer environmental concerns. In addition, tin does not require special handling by manufacturing workers involved in production and recycling.

It is noted that radiation shielding member 20 can be employed with other configurations of a dental x-ray packet than that shown in FIG. 1. For example, U.S. Pat. No. 6,474,864 (Resch) discloses a packet having a comfort-enhancing feature. Other configurations are shown in U.S. Pat. No. 6,309,101 (Bacchetta), U.S. Pat. No. 6,505,965 (McGovern), U.S. Pat. No. 6,579,007 (Bacchetta), U.S. Pat. No. 5,077,779 (Steinhausen), U.S. Pat. No. 4,922,511 (Gay), and U.S. Pat. No. 4,912,740 (Liese, Jr.).

Compounding can be accomplished by means known to those skilled in the art, for example, as disclosed in U.S. Pat. No. 6,505,965 (McGovern), commonly assigned, and incorporated herein by reference. The process by which the ingredients of the thermoplastic material and the non-lead metal powder and/or non-lead metal compound are intimately melt mixed together into as nearly a homogeneous mass as is possible is known as compounding. Due to the nature of both the thermoplastic resin or elastomer and these modifiers, compounding can take on a wide range of mixing such as, for example, in the form of dry powders, slurries, pastes and doughy consistencies. Due to the wide range of mixing forms there is a corresponding wide range of mixing operations. Thus, the resulting configurations of equipment and parameters for optimum distribution and dispersion of the modifiers can vary greatly.

The task of mixing becomes one of changing the original distribution of two or more non-random or segregated masses so that an acceptable distribution and dispersion of one mass throughout the other is achieved. Thus, the challenge becomes one of deforming or redistributing masses in order to achieve the desired effect. The compounding process exerts shearing forces on these modifiers to produce a distribution of particle sizes (primary particles and agglomerates). This is a step in the compounding process that achieves good overall dispersion of the modifier. As an example, the shearing forces are introduced through the use of either a single or twin set of segmented screws (both intermeshing and non-intermeshing) that can be set up to run in a clockwise or counterclockwise manner to maximize the dispersion efficiency of a given formulation.

The compounding process also exerts shear forces on the polymers. The viscosity is thus reduced so that the polymer will flow under pressure through a designed orifice (die). The thermoplastic material is essentially a fluid subjected only to laminar flow and is capable of being deformed. Thus, the problem of mixing in thermoplastics is that of subjecting such materials to laminar shear deformation in such a manner that an initially nonrandom distribution of ingredients approaches some arbitrary scale of randomness.

Mixing is usually complicated by the ingredients (modifiers) exhibiting interparticulate forces, so that the stresses accompanying the deformation must be considered as well as the deformation process itself.

The compounding process produces a long continuous strand, which is then cut to the desired individual length of single pellets suitable for use in other plastic conversion equipment such as injection molding machines.

Figure 5:
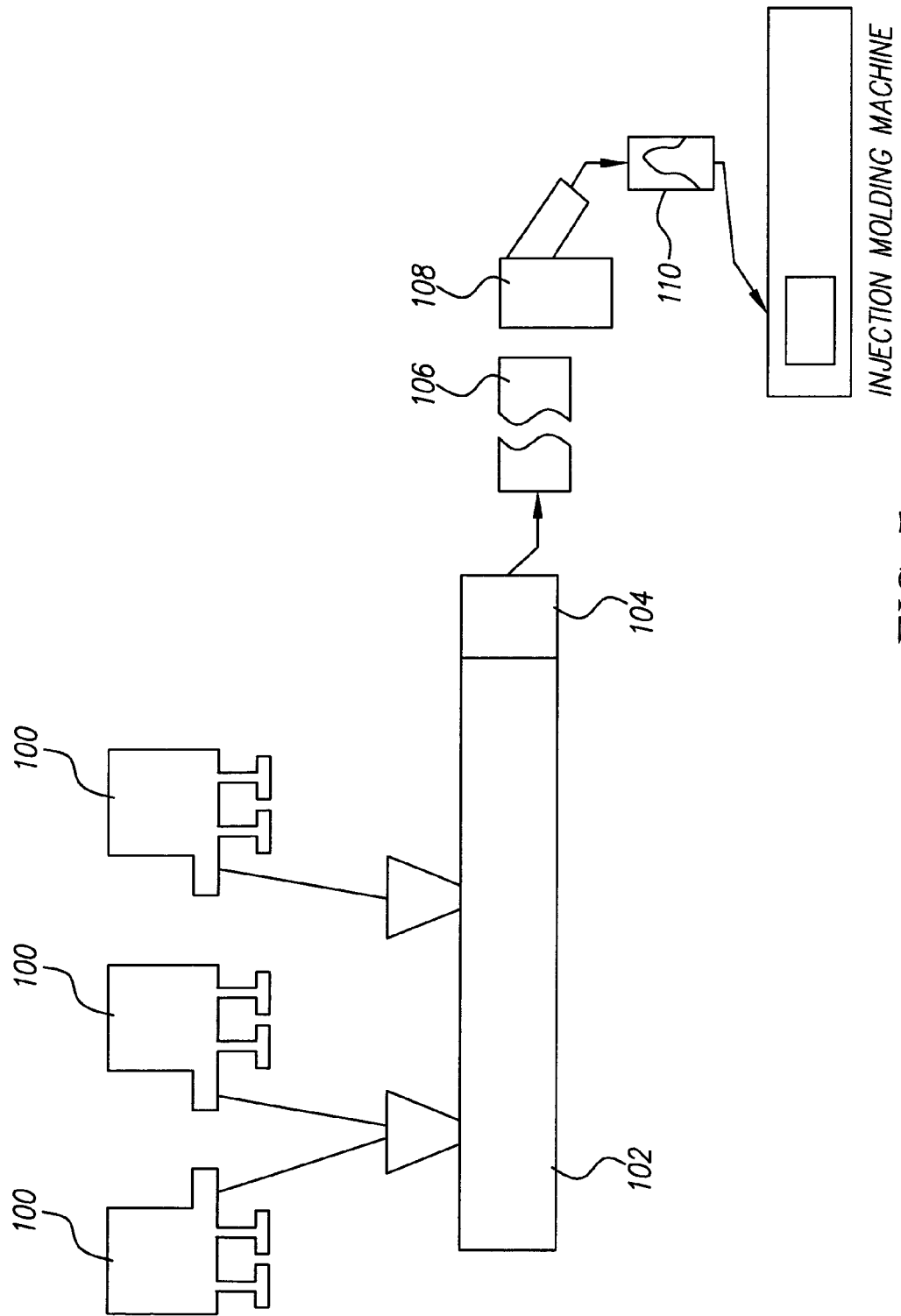
FIG. 5 is a schematic depicting an apparatus for compounding the thermoplastic material and the non-lead metal powder and/or non-lead metal compound.

FIG. 5 schematically depicted an apparatus suitable for compounding the thermoplastic material and the non-lead metal powder and/or non-lead metal compound. Gravimetric feeders 100 feed raw material ingredients to a twin-screw extruder 102. The raw materials are blended and melted in the twin-screw extruder 102 which includes a die 104 at the end thereof. Strands of thermoplastic material exit die 104 and enter cooler 106. The cooled strands of thermoplastic material are then delivered to a pelletizer 108 producing pellets of thermoplastic material that are delivered to bin 110.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST | |
|---|---|
| 10 | dental x-ray packet |
| 12 | thermoplastic sheets |
| 14A, 14B | thermoplastic sheet |
| 16 | paper wrap element |
| 18 | film chip(s) |
| 20 | radiation shielding member |
| 22 | laminated perimetric edge |
| 24A, 24B | thermoplastic sheet with radiation shielding |
| 25 | radiation shielding container |
| 100 | feeders |
| 102 | extruder |
| 104 | die |
| 106 | cooler |
| 108 | pelletizer |
| 110 | bin |

What is claimed is:

1. An intraoral x-ray film packet, comprising:
    an outer envelope including two opposing sheets wherein one of the sheets is comprised of a material including a thermoplastic and a non-lead metal powder and/or non-lead metal compound;
    a film chip disposed within the outer envelope; and
    a radiation shielding member disposed within the outer envelope, wherein the member is comprised of a material including a thermoplastic and a non-lead metal powder and/or non-lead metal compound.

2. The intraoral x-ray film packet of claim 1, wherein the film chip and the radiation shielding element are disposed within a light-tight envelope.

3. The intraoral x-ray film packet of claim 1, wherein the radiation shielding element is a foil thermoplastic laminate.

4. The intraoral x-ray film packet of claim 1, further comprising a protective covering configured such that the film packet can be disposed within the protective covering.

5. The intraoral x-ray film packet according to claim 1, wherein the radiation shielding element is comprised of at least 20 percent non-lead metal powder.

6. The intraoral x-ray film packet according to claim 1, wherein the radiation shielding element is comprised of at least 20 percent non-lead metal compounds.

7. The intraoral x-ray film packet according to claim 1, wherein the non-lead metal powder and/or metal compound absorbs between about 60 kVp to about 80 kVp of radiation energy.

8. The intraoral x-ray film packet according to claim 1, wherein the non-lead metal powder is tin, tungsten, zinc, iron, magnesium, titanium, bismuth, copper, aluminum or silver.

9. The intraoral x-ray film packet according to claim 1, wherein the non-lead metal compound is bromide, sulfide, oxide, chloride, phosphate, phosphite, iodide or nitride.

10. The intraoral x-ray film packet according to claim 1, wherein the thermoplastic is a polyester, polyethylene terphthalate (PET), PETG, PCTG, polyvinyl chloride, ethylenevinyl acetate, polyurethane, polyamdies, polycarbonates, polyethers, polystyrenes, ABS terpolymers, polymethylmethacrylate, styrene acrylonitrile copolymers, cyclic olefin coplymers, polyethylene, LDPE, LLDPE, HDPE, polypropylene, polysulfone, polyetherether ketone, or polyimide.

* * * * *